United States Patent
Blazevic et al.

[15] 3,671,044
[45] June 20, 1972

[54] MAGNETIC RECORDING AND PLAYBACK INSTRUMENT AND SUPPORT FOR MAGNETIC RECORDING

[72] Inventors: Milos Blazevic, 62, rue Georges Ferrand, Bonneuil-sur-Marne; Joseph Kohn, 146 Boulevard de Grenelle, Paris, both of France

[22] Filed: July 7, 1969

[21] Appl. No.: 839,471

[30] Foreign Application Priority Data

July 4, 1968 France..................................68157948

[52] U.S. Cl..............................274/4 J, 35/35 C, 274/42 P
[51] Int. Cl. ......................................................G11b 25/04
[58] Field of Search ..............274/4.2; 179/100.2 T; 35/35 C

[56] References Cited

UNITED STATES PATENTS

| | | | |
|---|---|---|---|
| 2,849,542 | 9/1958 | MacChesney | 274/4.2 X |
| 2,998,494 | 8/1961 | Nations | 179/100.2 T |
| 3,176,083 | 3/1965 | Hauser | 179/100.2 T |
| 3,185,776 | 4/1965 | Bender | 35/35 C UX |
| 3,348,320 | 10/1967 | Brokaw | 35/35 C |
| 3,396,478 | 8/1968 | Genin | 35/35 C |
| 3,412,483 | 11/1968 | Jacobs | 35/35 C |
| 3,471,654 | 10/1969 | Dollenmayer | 274/4.2 X |

FOREIGN PATENTS OR APPLICATIONS 384,233   2/1965   Switzerland ..........................274/4.2

Primary Examiner—Leonard Forman
Assistant Examiner—Dennis A. Dearing
Attorney—Waters, Roditi, Schwartz & Nissen

[57] ABSTRACT

Apparatus designed for playback of magnetic tracks from one side of a rectangular simultaneously with visual reading of a printed text corresponding to the recorded program on the opposite side. A movable marker, always moving from left to right across the lines of the text, provides a continuous indication correlating the audio replay with the text, the distance being transversed by the magnetic head from either side of the card being equal to the distance traversed by the marker from the left side of the card.

6 Claims, 10 Drawing Figures

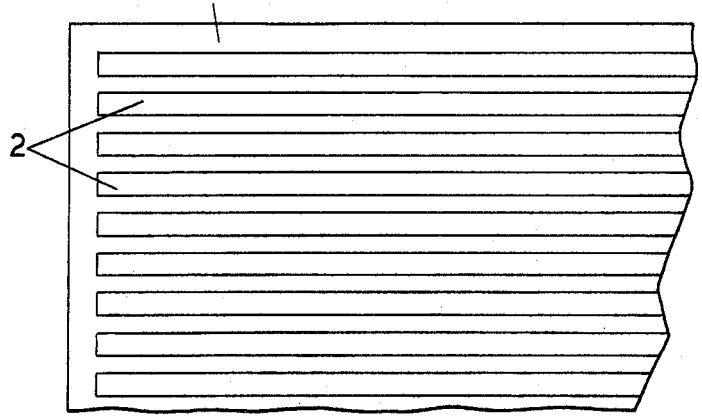
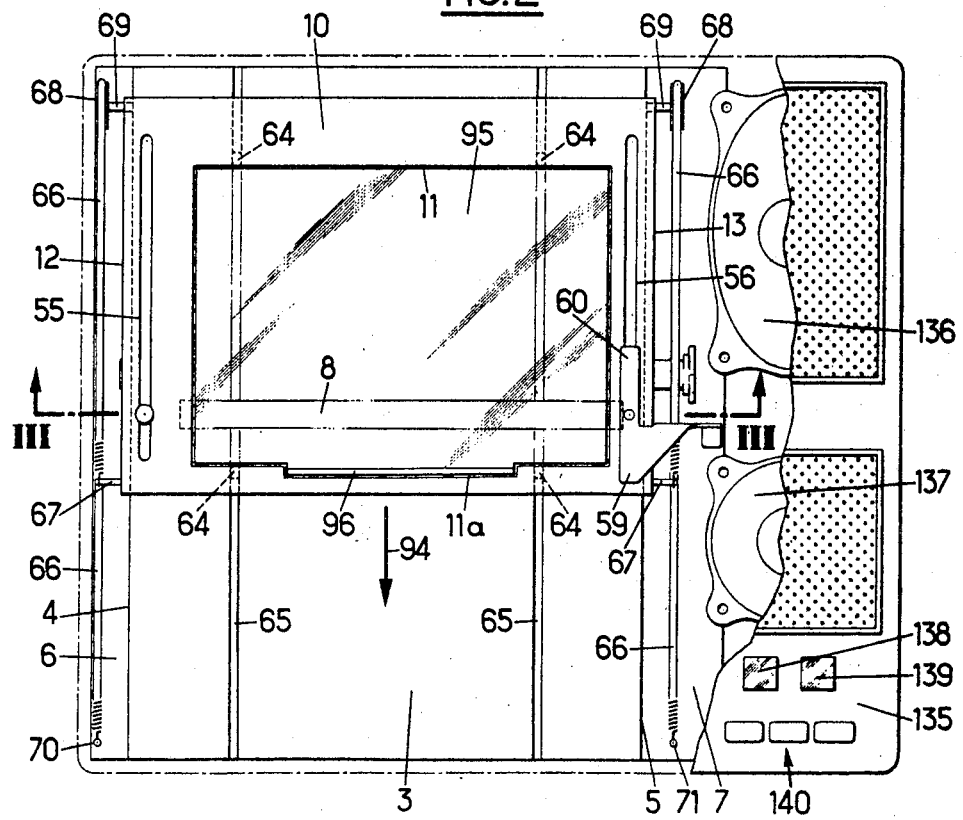

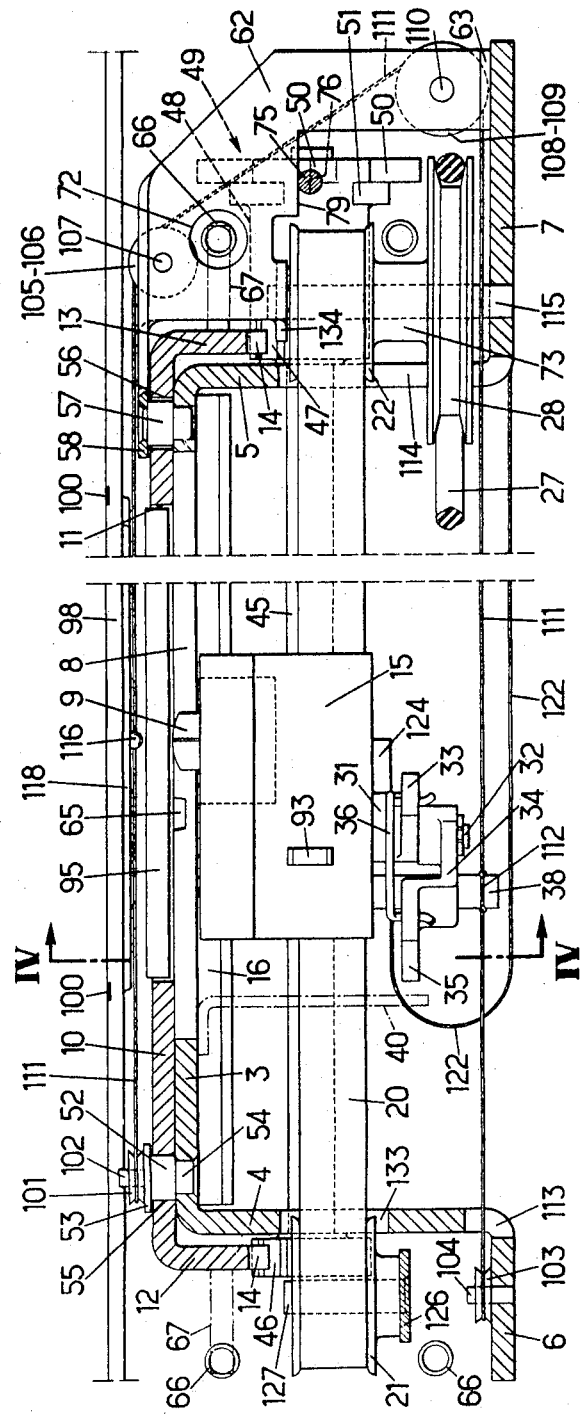

MAGNETIC RECORDING AND PLAYBACK INSTRUMENT AND SUPPORT FOR MAGNETIC RECORDING

The invention relates to the reacording and reading of sounds, especially words, on a magnetic support. It is known that, after having used steel wires which have been completely abandoned and then disks which are disappearing, devices for the recording and magnetic reproduction of sounds practically exclusively use magnetic bands for magnetic support. However, the latter present utilization difficulties which led to the development of different types of cases making possible easy use and a long-lasting recording. On the other hand, they present the drawback of a high price and they are very impractical in the frequent cases in which only a small recording quantity and an easy selection and identification are required and where an easy postal shipment is desired. Magnetic disks, whose recording duration is less, generally present too large a format to be sent by mail, and they present the drawback of a difficult position finding and identification of the recorded texts.

The purpose of the invention is that of creating a new magnetic recording means avoiding the above-mentioned difficulties and especially making it possible to record a small recording quantity on economic supports easy to forward which can readily be identified and with an exact position finding of each word recorded, at the same time serving as a visual support.

The present invention has as its object:

A. the new industrial product consisting of a new magnetic recording support, essentially characterized by the fact that it consists of a rectangular card, preferably with the format of a postcard, whose front side at least contains or receives a text or else a drawing or photograph and whose other side contains a magnetic coating.

B. the new industrial product consisting of an apparatus intended for sound recording and sound recording simultaneously with visual reading or examination of the foregoing card, this device being essentially characterized by the fact that it includes a plate intended to receive said card with its magnetic part below, a magnetic head borne by a carriage and moving in a groove in the plate alternately from left to right and then from right to left over the entire length of the card, exploring parallel tracks on the magnetic part of the latter, a frame surrounding the magnetic card and displacing the latter from front to back by a certain amount at each end of the course of the preceding frame, the upper part of the apparatus and the upper part of the frame being transparent over a sufficient extent to make it possible to examine all the registrations on the upper part of the card, the fixed upper part of the device additionally including a rectangular outline in its transparent part delimiting the printed or typed line on the card if there is a place corresponding to the sound part in course of reading under the effect of the displacement of the magnetic head for each position of the card, this fixed transparent part also preferably including an index always moving from left to right whatever the movement direction of the magnetic head and approximately finding the position on the length of the visible line of the word corresponding to that read or recorded at the same moment by the magnetic head. This device can also include the following characteristics taken separately or in combination:

1. The frame includes a transparent cover linked by its upper edge, and it is constantly drawn back to the rear by a spring device which is prepared by drawing the frame forward, preferably by action on a handle forming a solid piece with the transparent cover, the line-by-line movement of the frame from front to back being produced by a release set in motion by each end of course of the carriage.

2. The release mentioned above consists of a wheel with alternate teeth in one piece with a shaft bearing two pinions which mesh on two racks located on both sides of the frame, and the finger of this wheel consists of the bent end of a rod parallel to the foregoing shaft shaft and bearing lugs met by the carriage in the vicinity of each of its course ends, this rod including a spring or unit of springs returning it axially into a fixed middle position as well as a spring entraining it in rotation on itself so that the release finger is blocked by the teeth of the release wheel against a lug fixed in the stoppage direction and on the other hand releases this wheel on the return of the carriage under the manual action mentioned above.

3. The carriage mentioned above is supported by slide bars and moves by means of an endless belt which is entrained by a continuous movement and whose two sides are parallel to the movements of the carriage, a mechanical or electric abrupt release device operated by fixed and regulable end of course lugs inducing engagement of the carriage alternately on one side and on the other, said lugs being regulated so that the sudden change in displacement direction of the carriage is produced at the same time as or immediately after the liberation of the end of line release mentioned above.

In order to better understand the object of the invention, a mode of execution will be described below by way of illustration and without any limiting character and will be represented in the attached drawing, in which:

FIG. 1 represents a part of a magnetic card in accordance with the invention;

FIG. 2 represents a top view of the overall mechanism of the recording and reproduction apparatus with the use of these cards;

FIG. 3 represents in greater scale a vertical section along III—III of FIG. 2 with the carriage in outside view;

Figure 7:
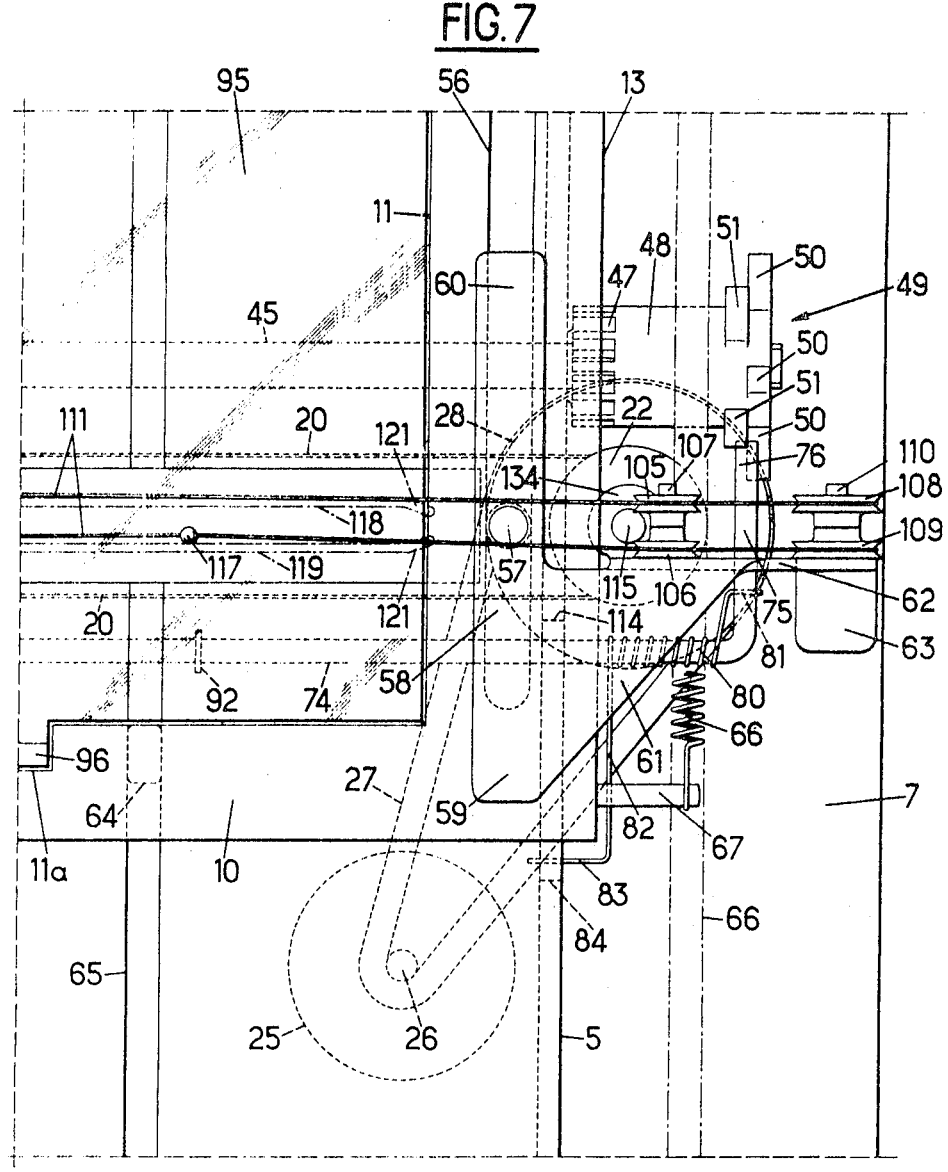
Figure 8:
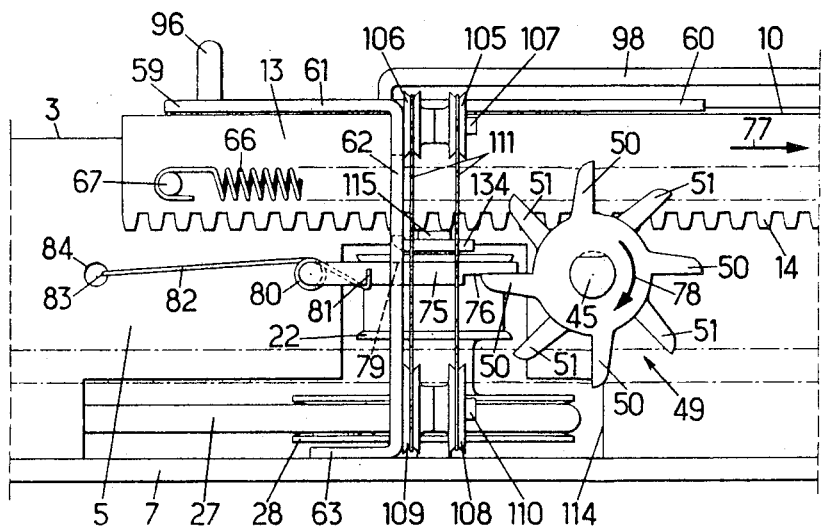
Figure 9:
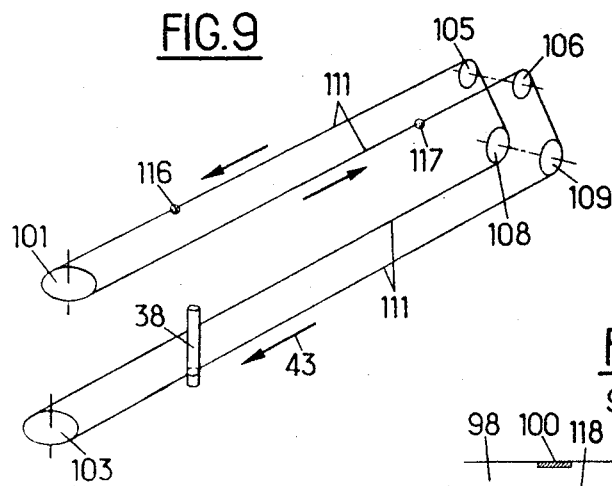

FIG. 7 also represents a top view on a larger scale of the right part of the mechanism;

FIG. 8 is a side view of the right part of the mechanism;

FIG. 9 is a drawing illustrating the position finding functioning; and

Figure 10:
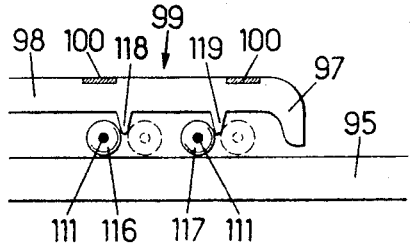

FIG. 10 represents a vertical section on a greater scale through the transparent cover and the edge of the fixed upper part.

The apparatus in accordance with the invention uses as support magnetic cards each consisting of rectangle 1 of plastic material or bristol, an enlarged fragment of which is seen in FIG. 1. For practical reasons, this rectangle preferably has a format close to that used for postcards in order to expedite forwarding by mail. By way of example, this format can advantageously have a length of 148 mm and a height of 105 mm. The back of this card is covered by a magnetic support of known type either by coating or by gluing, and the front side of the card can be used, according to an essential characteristic of the invention, as a support for visual registrations which can consist of horizontal lines 2 of a printed or typed text or of an engraving, photograph, drawing or geographic chart, this for the purpose of simultaneously having a visual illustration in the form of image or written text and the corresponding sound illustration on a single support. In particular, the sound illustration can be the correctly pronounced reading of the written text. The magnetic support located on the back of each card is of continuous type without grooves, but as will be seen below the sound is recorded thereon in the form of parallel straight-line tracks on writings lines 2 and corresponding thereto.

In order to achieve the recording and sound reproduction of such a card, it is of course necessary to utilize a special device which is also the object of the invention, on the one hand because of the particular movement which the magnetic head should make in order to explore the parallel tracks alternately, on the other because of the need to be able to observe the front side of the card at the same time that the magnetic head explores the back side.

FIG. 2 presents an overall view of the device with a section cut away to make it possible to see the essential part of the mechanism. The latter consists of plate 3, for example made of sheet aluminum having, as represented in FIG. 3, an inverted pan section with vertical edges 4 and 5 forming parallel parallel plates and themselves terminated by horizontal edges 6 and 7. This plate contains in about its center a rectangular slot 8 of a length slightly greater than that of card 1 and in which magnetic head 9 moves.

On this plate rests frame 10, which can also be cut out of an aluminum sheet and which contains central opening 11 of the same format as card 1 and intended to receive the latter. This frame 10 is prolonged on the two sides parallel to bottle 5 by vertical edges 12 and 13 which are terminated below by teeth 14 forming a rack.

Exploration of the magnetic tracks corresponding to lines 2 takes place by movement of magnetic head 9, card 1 remaining immobile, whereas the passage from one track to the next takes place by movement of the card on the plate under the displacement effect of frame 10.

Figure 4:
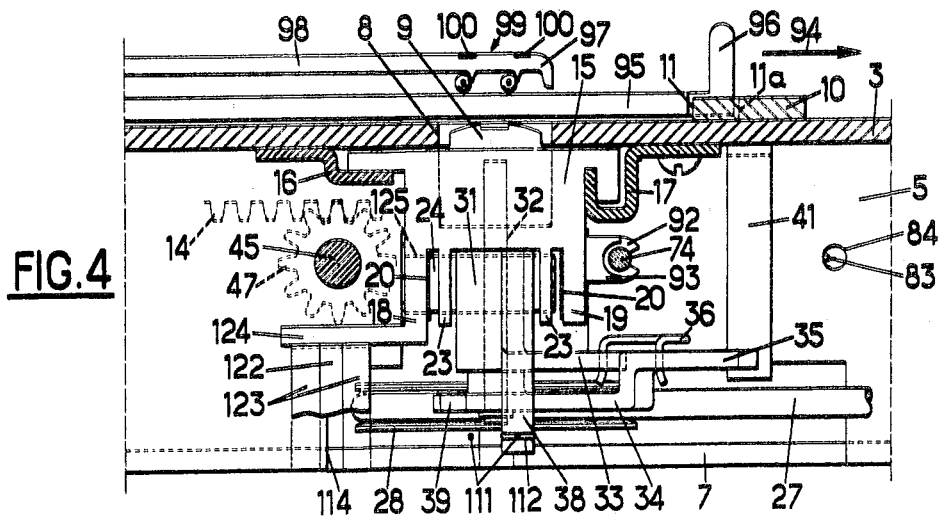
FIG. 4 is a partial vertical section along IV—IV of FIG. 3.
Figure 5:
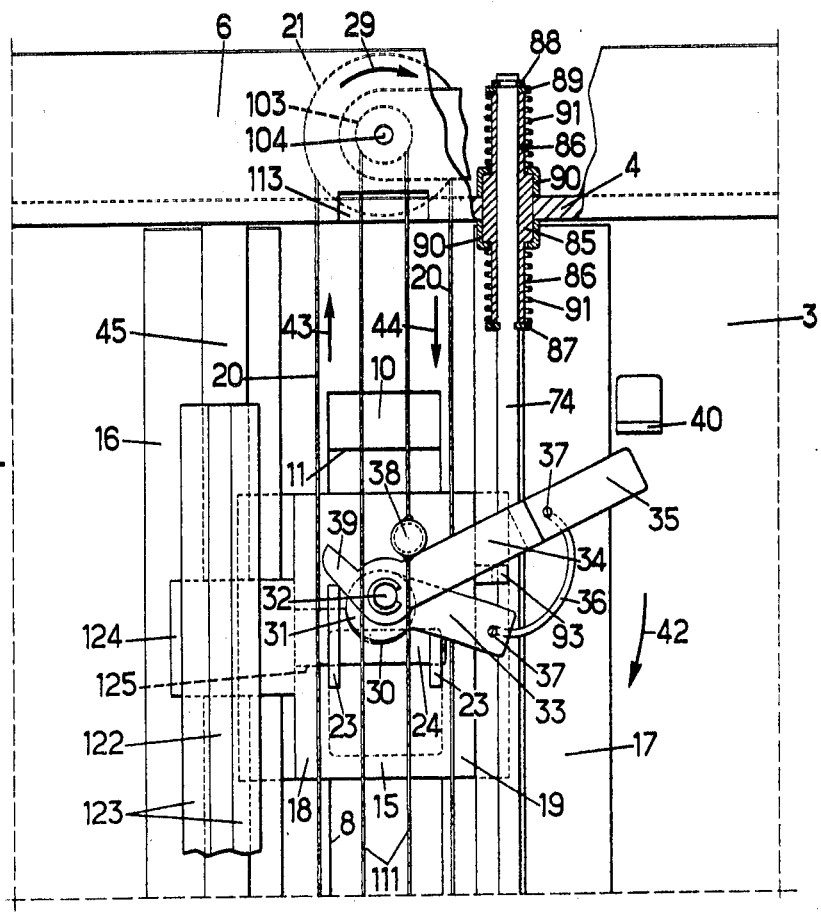
FIG. 5 is a bottom view of FIG. 4.

With respect to the movement of magnetic head 9, the latter is set in carriage 15 which glides in guide rails 16 and 17 preferably consisting of steel sections fixed under plate 3. In order to reduce friction and inertia during movement direction changes, it is important for this carriage to be as light as possible, and it can advantageously be made of self-lubricating plastic material. As is represented in FIGS. 4 and 5, the carriage includes two parallel walls 18 and 19 under its lower surface, and an endless belt 20 forwarded on two pulleys 21 and 22 is arranged so that its two parallel sides pass between walls 18 and 19 extremely close to each other. Two flanges 23 are arranged between these walls in pierced-ear form, each with a central hole in which a cylindrical piece 24 made of metal or plastic material slides whose length is equal to the inside distance between the two walls 18 and 19 minus two times the thickness of endless belt 20 and also minus a very small value making it possible for a play to appear.

Endless belt 20 can be of any nature, for example, a belt made of plastic material of very slight thickness or else a cloth belt possibly surrounded by a plastic material or an elastomer with a high coefficient of adhesion. It can also be provided with fine vertical grooves, in which case the ends of cylindrical part 24 would preferably also be grooved, as well as the drive pulley.

It is then understood that, in order to assure the movement of the carriage in one direction or another, it is sufficient to entrain endless belt 20 with a continuous movement and to move cylindrical part 24 in one direction or the other so that it engages the carriage on the going side or on the return side of this endless belt. The driving of this belt 20 takes place by means of a suitable engine 25 provided with pulley 26 which, by means of belt 27, activates a large pulley 28 in one piece with pulley 22 so that endless belt 20 moves with a continuous movement in the direction represented by arrow 29.

In order to move part 24 axially, cylindrical transverse groove 30 is provided in same, within which a cylindrical part 31 is located crossed by excentric shaft 32 which is mounted in carriage 15 and which permits part 31 to turn freely. The lower part of part 31 is in one piece with lever 33, so that movement of this lever produces a movement of cylindrical part 24 with considerable reduction, permitting the desired engaging.

A second lever 34 is mounted so as to be able to oscillate around the same shaft 32. This lever 34 is located below lever 33, and it ends in part 35 located at approximately the same level as lever 33. A compression spring, consisting in a simple arc 36 made of piano wire located in a horizontal plane and terminated by two vertical parts 37, is placed between parts 33 and 35, which contain two holes in which said vertical parts are connected, whose lower ends are simply inclined or curved to prevent the spring from escaping. The clearance course of lever 33 is limited because of the limited play permitted to piece 24. On the other hand, the course of lever 34 is limited by column 38 mounted in carriage 15 and on which the edge of part 34 butts in one direction, as represented in FIG. 5, and in the other direction point 39 prolongs this part 34 beyond shaft 32.

It is understood under these conditions that it is sufficient to place side plates 4 and 5 of lugs 40 and 41 in proximity, each consisting (FIGS. 3, 4 and 5) of a simple sheet metal flange whose bent upper ends is fixed on plate 3 in order to produce a tilting of lever 34 at the end of the carriage course by acting on its end 35.

In the condition represented in FIG. 5, in fact, and with the rotation direction selected, it is seen that spring 36 is supported on lever 34, which it pushes back as a thrust against column 38, and lever 33 is pushed in the direction represented by arrow 42 so that cylindrical part 31, because of its eccentric nature, pushes cylindrical piece 24 towards the left side of FIG. 5, which produces both the liberation of the right side and the catching of the left side of belt 20 between wall 18 of the carriage and the end of piece 24, so that the carriage moves in the direction of arrow 43.

Having arrived at the end of the course, part 35 then encounters lug 40 and, with carriage 15 continuing its movement, lever 34 pivots in the direction of arrow 42 and compressing arc 36. Both parts 37 then enter into alignment with shaft 32, and immediately after lever 33 tilts abruptly toward the top of FIG. 5 whereas lever 34 is pushed back downward until its point 39 hits column 38. This abrupt tilting of lever 33 produces, by decentered cylindrical part 31, a disconnection of the side of belt 20 located at the left of the figure and an engagement of the side of belt 20 located at the right. Carriage 15 therefore instantaneously changes its movement direction and again goes off in the direction represented by arrow 44.

Carriage 15 then covers the entire width of the device in direction 44 until part 35 of its lever 34, which is tilted in the manner indicated, encounters the other lug 41 at the course end, which produces a reverse tilting, and so on.

In order for this instantaneous reversal of the movement direction to take place correctly, of course, it is necessary for carriage 15 as well as the pieces it supports to be as light as possible, as stated above, and on the other hand for the drive device of the belt to have a sufficient inertia, which can readily be obtained by adding an unrepresented inertia flywheel to drive engine 25 if necessary. In order to record, the displacement speed of carriage 15 can be set at 2.38 cm/second, which permits a correct magnetic registration and makes it possible to easily read printed lines 2 at the same rate.

With respect to the movement of frame 10 permitting a successive exploration of the different tracks corresponding to the different lines, another mechanism is used especially including a shaft 45 which passes through the two side plates 4 and 5 through suitable holes so as to be able to turn freely on itself. At its left end, shaft 45 includes a pinion 46 which is in one piece with it and which engages teeth 14 of rack 12 of frame 10, and at its right end this shaft has a similar pinion 47 engaging with teeth 14 of rack 13, this pinion being extended further by part 48 terminated by a two-stage release wheel 49 containing an even number of teeth, for example eight in the example represented. It is seen in FIGS. 3 and 8 that half the teeth, designated by 50, are located at a certain level and that the other teeth 51, alternating with the foregoing, are located at a different level.

Both pinions 46 and 47 are adjusted very exactly on shaft 47, preferably by means of two flat bar irons applied at both ends of this shaft so that the sides of frame 10 are exactly parallel to those of plate 3 by the simultaneous engagement of both racks 12 and 13. Under these conditions, the two racks and the two pinions being identical from the standpoint of dimensions and modules, any movement of a rack causes a rigorously identical movement of the other so that frame 10 constantly remains parallel to itself in all its movements. In order to avoid a side clearance of frame 10, moreover, cylindrical stud 52 terminated by a head 53 and fixed at its base 54 in plate 3 is placed at the level of rectangular slot 8, this stud passing through frame 10 through hole 55 made in the left side of the frame. The width of this hole is equal to the diameter of stud 52 with a play just sufficient for permitting sliding.

A hole 56 is also provided on the right side, through which stud 57 also fixed in plate 3 is passed, but in such a way that a considerable play is provided between this stud and the edges of hole 56. At the upper part of this stud 57, the horizontal part 58 of a folded sheet piece is fixed, containing a front extension 59 and a rear extension 60 as well as a part in brace form 61 connecting this horizontal part to a vertical part 62 itself terminated at its base by flange 63 fixed in lower edge 7 of plate 3 (see FIGS. 1, 3 and 7).

In its movements from front to back and from back to front, frame 10 rests on plate 3 by its own weight, consequently driving card 1, which is deposited into opening 11, by its edges. In order to prevent the raising of the frame, a just sufficient play is provided below head 53 of stud 52 and beneath part 58 fixed to other stud 57. On the other hand, the frame cannot tilt upward in its extreme positions since it is also retained by extension 59 when it is in its most forward position and by extension 60 when it is in its rearmost position. For safety's sake, finally, in order to avoid the possibility of card 1 being able to slide between frame 10 and plate 3, two or more lugs 64 are arranged below each of the horizontal sides of this frame which are flush with inner cutting 11 of the frame and which descend below the upper level of plate 3, sliding in clearance grooves 65 cut into plate 3.

Two release springs 66 of small diameter, great flexibility and considerable length are used for the drive of the frame; they are each hooked in the groove of a lug 67 fixed on one of the edges of the frame in the vicinity of its forward end, each of these springs extending horizontally up to pulley 68 turning freely around shaft 69 respectively fastened in side plates 4 and 5, and then these springs return in a horizontal or slightly inclined direction and are respectively hooked on lugs 70 and 71 of unequal lengths fixed vertically in edges 6 and 7 of plate 3 at their front end. The upper side of spring 66 passes through vertical part 62 on the right side through clearance hole 72, and the lower side passes between pulleys 22 and 28 connected to form a single piece by cylindrical part 73 of small diameter. Because of the flexibility and length of these springs, the latter exert an almost constant effort on the carriage in a practically symmetrical manner, driving the latter constantly from front to rear, whereas on the contrary release 49 serves to retain this movement of the frame by the action of pinions 46 and 47. All the plays of the teeth are constantly recovered in this way, which gives a great precision to the unit.

A rod 74 extending parallel to shaft 45 in the vicinity of carriage 15 and crossing side plates 4 and 5 in suitable holes so as to be able to both slide and rotate in these holes is used in accordance with the invention to effect immobilization of release wheel 49 and its release at each line end.

Rod 74 is terminated on the right side by bent perpendicular part 75, itself cut at its end so as to prevent a lower level part 76 which engages between the two levels of teeth 50 and 51 as represented in FIGS. 7 and 8. Frame 10 is driven toward the rear under the effect of the action of springs 66 in the direction represented by arrow 77 in FIG. 8, which has the effect of driving shaft 45 in the direction represented by arrow 78. Under these conditions, tooth 50 or 51 tends to raise part 75 at the contact 76 and takes it away in a thrust against horizontal edge 79 of the lower contour of vertical part 62 mentioned above (see FIGS. 3 and 8). In addition, a light spring 80 surrounds the right end of rod 74 and catches at 81 under part 75, this spring extending forward by rectilinear part 82 whose perpendicular end 83 catches in hole 84 of side plate 5. This spring also acts in the direction in which part 75 passes in thrust against edge 79.

As is seen in FIG. 5, rod 74 is inserted into a socket at the other end, for example made of brass or plastic, containing a cylindrical central part 85 prolonged by cylindrical parts of slight thickness 86. The end of one of these parts 86 rests against element 87 placed in a groove of rod 74, and the end of the other part 86 is pressed by elastic element 88 by means of ring 89. Around each of parts 86 slides cup 90, whose bottom is perforated by a hole and whose cylindrical edge is supported on side plate 4. Finally, two compression springs 91 are each arranged around a part 86 between the bottom of one of cups 90 and element 87 or ring 89. In the position represented in FIG. 5, both springs 91 are already partially compressed so that the cups are supported on shoulders located at the ends of cylindrical part 85, the edges of the cups coming in contact with side plates 4 and leaving a very slight play to permit a free rotation of rod 74.

It is readily seen that this spring device has the effect of constantly restoring the rod into a axial position of fixed equilibrium since when the rod is displaced axially in one direction or the other, no matter how little it is, cylindrical part 85 slides in the hole of side plate 4 and one of its ends releases contact with the bottom of the corresponding cup, thus permitting the return effort of corresponding spring 91 to act, whereas the other cup swings clear of side plate 4. In rest position, consequently, the rod is always presented in the position shown in FIG. 5, and it is under these conditions that flat part 76 is symmetrically placed mounted on the separation plane of teeth 50 and 51.

On the right side, rod 74 contains another element 92 identical to element 87 seen in FIG. 7. Finally, as is seen in FIGS. 4 and 5, carriage 15 contains side flange 93 whose contour passes very close to rod 74 in order to be able to catch elements 87 or 92 at the left or right at the course end.

It is seen under these conditions that when the carriage is moved in the direction of arrow 43 in FIG. 5, flange 93 also drives rod 74 in the direction of arrow 43 at the end of the course, catching element 87. Bent part 75 is moved horizontally to the left under these conditions, sliding below edge 79, and its flat part 76 ends by allowing tooth 50 which it retains to escape. Frame 10 then advances immediately by the interval corresponding to a line under the effect of springs 66, and release 49 turns in direction 78 until the following tooth 51 thrusts below flat face 76. After a change of the movement direction of the carriage, the unit of rod 74 and its bent part 75 returns to medial position without passing anything, whereas when the carriage catches element 92 by its flange 93 at course end in moving toward the right, rod 74 moves toward the right in this case, which similarly frees tooth 51 and catches the following tooth 50.

It is important to note that carriage 15 produces two actions at each end of course, one corresponding to the change in line and the other corresponding to the change in direction of engagement 24. It is important for these two actions to take place in the order given and not in reverse order because if the change in direction on the part of the carriage in fact takes place before the line change release, the latter will never take place. The position of side flange 93 on the carriage as well as the positions of elements 87 and 92 are consequently determined by construction so that the magnetic head exactly covers the entire length of the card. With respect to lugs 40 and 41, they are regulated by simple permanent deformation so that the release of the carriage direction reversal device takes place immediately after the line change.

At the beginning of the operation, work starts by manually drawing frame 10 forward in the direction represented by arrow 94 on FIGS. 1 and 4, consequently stretching the two springs 66. In this movement, release 49 turns in the direction opposite to that represented by arrow 78 in FIG. 8, which results in depressing bent part 75 of lug 74, which rotates on itself in the side plates. The unit thus functions like a ratchet wheel, and at the course end catching by part 76 takes place again under the effect of return spring 80.

In order to effect this initial movement of frame 10, use is preferably made of a transparent cover 95 (see FIGS. 2 and 4) fitting exactly into opening 11 of frame 10 and connecting at the rear part of this frame by means of two unrepresented end pins. At the front end, this cover 95 terminates in pinion 96 placed in suitable clearance 11a made in the lower edge of opening 11. It is in this way possible to catch pinion 96 with the fingers and pull in the direction of arrow 94 until frame 10 is in stop and then, still acting on same pinion 96, to raise the cover to make it rotate around its pivots, the cover then being placed in a vertical or inclined position just in front of edge 97 of the fixed and transparent upper part 98 of the device case (not represented in FIG. 2). It is especially seen that, even if the drive engine is left in permanent rotation, the simple opening of cover 95 immobilizes the frame and makes the line advance mechanism inoperative. It is then readily possible to put a card in position in opening 11 and then close the cover, which immediately frees the movement of the frame.

It is important to note that, according to one feature of the invention, all the magnetic tracks corresponding to odd lines are explored by the magnetic head from left to right, for example, whereas all the tracks corresponding to even lines are explored in the reverse direction, but due to the mechanism used a direction reversal is not possible. At each end of course, in fact, a release is produced only if retention trigger 75 and consequently the carriage are moved in a suitable direction.

After each introduction of a new card, the carriage makes a certain number of blank courses, two, for example, in order to permit the first track to pass edge 97 of fixed part 98 and to arrive at the height of slot 8 passed through by the magnetic head. At the same time, if the upper part of the support contains a written text, the first line of this text is placed beneath a rectangular window 99 delimited by opaque tracing 100 on fixed part 98 (see FIGS. 4 and 10). The lines and the following magnetic tracks are then explored one after another, frame 10 and consequently card 1 advancing at each line end so that the new magnetic track appears at the level of the magnetic head and the new corresponding writing line is presented below window 99.

In order to facilitate position finding of the location of the line which at a given moment corresponds to the word which is read by the magnetic head at the same instant, it is especially useful as an improvement to provide for an index moving in window 99 permitting the position finding of this word. However, such an index cannot consist of a part in one piece with carriage 15 on the one hand because the carriage moves below the lower surface of card 1 whereas the index necessarily should move above and on the other because the exploration of the magnetic tracks by the magnetic head takes place alternately from left to right for add lines and from right to left for even lines, whereas on the other hand written lines are of course always read from left to right. However, it is possible to overcome these two difficulties by means of a particularly simple mechanism represented in the figures.

Figure 6:
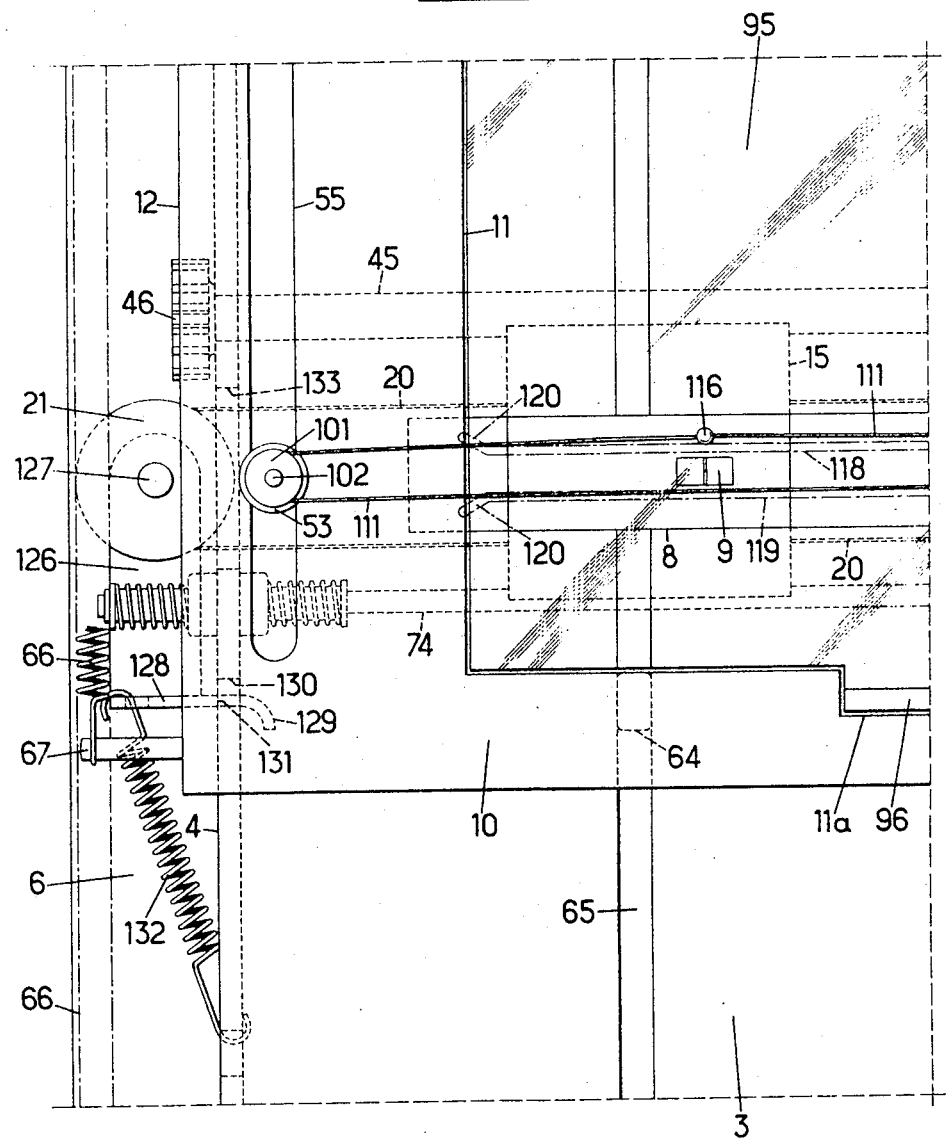
FIG. 6 represents a top view of the left part of the mechanism on a greater scale.

This position-finding mechanism uses, as represented in FIGS. 3 and 6, a small pulley 101 rotating freely around cylindrical part 102 extending cylindrical stud 52 beyond its head 53 as well as a small similar pulley 103 rotating around a shaft 104 attached in edge 6 of plate 3. As is seen in FIGS. 3 and 7, two pulleys 105 and 106 are used on the right side, rotating freely around a shaft 107 set perpendicularly in vertical wall 62 and two other pulleys 108 and 109 rotating freely around shaft 110 also fixed perpendicularly to vertical wall 62. On the other hand, very fine thread 111 is used, for example a polyamide monocrin thread, one of whose ends is attached in groove 112 made at the end of column 38 described above. This thread passes around pulley 103, passing through side plate 4 through a suitable window 113 and then returns through this same window, transversely passing through the entire apparatus and going through window 114, which releases the passage of pulleys 28 and 22 connected by part 73 with passage of shaft 115, around which the foregoing unit rotates. This thread then passes on the farthest rearward pulleys 108 and 105 and extends horizontally along tracing 100 of the upper edge of window 99, and then after return around pulley 101 it returns along tracing 100 of the lower edge of this window. Finally, after having passed pulleys 106 and 109, the thread again passes window 113 and is attached in groove 112 of column 38.

The course of this thread 111 has been schematically presented in perspective in FIG. 9. It is especially seen that, when carriage 15 moves in the direction represented by arrow 43, the horizontal side located at the upper and rear part moves in the same direction whereas the side located in front moves in the opposite direction, and of course all directions are reversed when the carriage moves in the opposite direction.

Two small colored beads 116 and 117, for example made of plastic, are then set, in accordance with the invention, one on the back side of the thread and one on the front side in positions such that when the magnetic head is located at the left edge of card 1 bead 116 is located on the face of the same edge and bead 117 at the right edge. When an odd line is read and the carriage moves in direction 44, it is guiding mark 116 which therefore follows the written text, whereas when an odd line is read it is guiding mark 117 which reads the written text. It is therefore necessary to alternately mask one guiding mark or the other, which in each case is the one moving from right to left.

It is simply possible to provide for this purpose beneath the lower surface of transparent part 98 two grooves 118 and 119, the lower edge of each of which exactly corresponds to the track of one of the sides of thread 111 when it is stretched freely. As is seen in FIGS. 6 and 7, these grooves 118 and 119 bear divergent parts 120 on the left side at the ends and convergent parts 121 on the right side.

Finally, as is seen in the segment in large scale in FIG. 10, these grooves permit a passage between their lower surface and the upper surface of cover 95 which is distinctly insufficient to permit beads 116 and 117 to pass from one side of each groove to the other.

It is easy to see that, when an odd line is explored and bead 116, as has been seen, moves from left to right, it is moved toward the interior of window 99 by grade 120 of edge 118, whereas on the contrary bead 117 is moved by grade 121 of edge 119 toward the outside, therefore below opaque track 100 of the lower edge of the window, which conceals it. The utilizer therefore only sees bead 116 which is moving from left to right. For odd lines, the same process causes bead 116 to be diverted toward the outside by grade 121 and it is consequently hidden by track 100, head 117 only then being visible and also moving from left to right, whereas the magnetic head on the contrary moves from right to left.

From a construction standpoint, it is of course necessary to provide for an electric connection between magnetic head 9 and the electronic part of the device. This connection can be provided by all known means, especially by thin ribbon 122 made of insulating material containing two conducting parts 123, this ribbon being fixed on the one hand below a horizontal wing 124 perpendicularly extending wall 18 of the carriage (see FIGS. 3, 4 and 5) and on the other hand on a fixed part located in the bottom of the case or else on edge 7 of the plate. In this manner, this ribbon rolls on the bottom of the unrepresented casing during the alternate movements of the carriage, producing practically no parasitic effort or any wear.

As has been seen, carriage 15 is preferably made of plastic, which makes it possible to provide for all the extensions with which it is provided in a single piece. However, in order to permit the stripping of the two holes of flanges 23 also a part of same as well as the mounting of cylindrical piece 24, a circular hole is provided in wall 18 in an extension of the foregoing holes and which is plugged by a fixed, screwed or glued plug 125 and comes from the inside exactly at the level of the wall.

In order to extend endless belt 20, on the other hand, a horizontal sheet piece 126 is used as represented in FIGS. 3 and 6, at one end of which is fixed shaft 127 around which pulley 21 rotates freely. The other end of piece 126, bent upward to a certain height, consists of vertical part 128 which is extended by catching flange 129 inserted into a suitable slot 130 made in side plate 4, allowing shoulders 131, which are supported on side plate 4, to remain above and below this flange 129. Finally, spring 132 is stretched between the edge of vertical part 128 and side plate 4, as represented in FIG. 6, catching in suitable holes. Side plate 4 naturally also contains window 133, through which belt 20 and a part of pulley 21 pass. On the opposite side, vertical part 62 already mentioned contains flange 134 bent upward and perforated by a hole in which passes shaft 115, which is engaged by its other end in a hole bored in edge 7 of plate 3.

Finally, the device is completed by casing 135 containing this entire mechanism and also containing loudspeaker 136, microphone 137, recording control 138, galvanometer 139 also serving to confirm the charge state of the battery and the modulation level, and finally keyboard 140 formed from three contacts including stop, recording and reading. The necessary electronic part, especially including the amplifier in the form of a printed circuit and electronic components with regulation potentiometers, is enclosed for example in the right part of casing 135, only a fragment of which is seen in FIG. 2. It is seen that a very great place remains available below plate 3, especially at the rear, especially in order to make it possible to house the feed batteries, the complete apparatus being very flat and of a very small format.

It is possible to add, as an improvement, an unrepresented contact activated by the course end of frame 10 to the rear and which automatically stops the device, including the motor after the reading of the last line. Finally, unrepresented contacts are also provided, activated by the ends of course of carriage 15 and which interrupt the recording and reading during the line change and reversal of the direction of the carriage; an electronic signal damping device is also provided to avoid the cracking which a sudden restoration of the circuit would produce.

In order to record with the card format represented above, it is especially important to use 12 teeth of modulus 0.7427 for pinions 46 and 47 which, with the number of teeth provided for the release, gives an advance rate of 3.5 mm between each line. This makes it possible to put 29 lines of perfectly legible and possibly typed lines, which are preferably numbered at the margin, on the front side, and on the reverse side 29 magnetic tracks also 3.5 mm from each other, the axis of the first and last lines also being 3.5 mm away from the corresponding edge. It is easy to calculate that the total recording time for these 29 tracks at the given speed of 2.38 cm/second is 3 minutes, which is a duration perfectly adapted for ordinary usage.

Among the possible applications of the device, it is especially important to point out a study of foreign languages to the extent that the apparatus makes it possible to read sentences at the same time, followed word for word by the indices with the exact orthography of these words and to hear the exact pronunciation of the sentences, of course also with the possibility of conducting pronunciation exercises by mail; the student can record or repeat sentences on tracks left free in accordance with written instructions and to send the entire material by mail.

It is especially seen that the apparatus instantaneously makes it possible not only to change the card but also to go back and to read any line as often as desired, with position readily found in window 99 and also by the marginal numbering, simply by drawing the frame backward on pinion 96 by manual action.

The same apparatus also makes it possible to teach all subjects by combining the sound document with the written document or possibly a document designed in the form of a photograph, a drawing, a geographic chart or any kind of figure tracing. It can also serve for advertising or other purposes.

It is important to point out that, because of the use of a transparent magnetic support of known type, it is also possible to place a visible document, for example a photograph, on the back of the card, which is then covered with a transparent magnetic support, the front side then remaining free to serve in one part of the card for example as a support for writing and in the other part of the card as a support for receiving the mailing address and postage, which makes it possible to send a photographic card through the mail with 3 minutes of sound recording made by the correspondent and accompanied by a text or not, even without an envelope. The front side could also be covered by a second transparent magnetic support to use both sides of the card at both ends.

The device can of course also be used as a dictaphone for secretaries, with a possibility of putting the cards in files, and as a recorder for recording any sound document, including music.

In addition to all the advantages examined above, derived from the simplicity and small volume of the device, its easy use, the simultaneous presentation of an image and sound and its ability to store, sort, classify and select cards, the support used finally presents great importance from a commercial standpoint due to its great ease in duplicating. Because of the use of 29 parallel tracks, in fact, this duplication can take place extremely simply by passing each card once before a multiple magnetic head with 29 tracks, which is extremely rapid in comparison with the slowness of magnetic tape duplication means and even magnetic disks.

It is of course understood that the mode of execution described above does not involve any limiting character, and it can undergo all desirable modifications without thereby departing from the scope of the invention.

In particular, the engaging of the carriage on the two sides of the endless belt could be obtained electrically, in which case the activation of the release could then advantageously also be obtained electrically and simultaneously with the above, i.e., released by the same impulse. On the other hand, the alternate movement of the carriage of constant linear speed could also be affected in a known manner, either by means of a screw or two parallel screws or by means of a heart-shaped cam.

It is also possible to provide magnetic cards or an apparatus permitting writing and recording on the same face of the card.

We claim:

1. An apparatus for the purpose of sound recording and for simultaneous playback with visual reading of rectangular magnetic cards, each comprising on their face a predetermined number of lines of printed text extending laterally over substantially the entire length and depth of the card and spaced at a constant distance from each other, and having a magnetic coating on the back, said apparatus comprising: a support plate for maintaining said card with its magnetic coating facing downwardly, said support plate having a laterally extending slot of a length greater than the length of said card; a movable frame supported on said card support plate, said frame having a central aperture defining an opening adapted to receive said card so as to engage the peripheral edges thereof, said frame further including a transparent upper portion forming a pressing means for positioning the card in said frame aperture and pressing it against the surface of said card support plate; a magnetic head positioned below said card and extending into said laterally extending slot to contact the magnetic-coated surface of said card; carriage means supporting said magnetic head; means for imparting motion to said carriage means to facilitate travel of said magnetic head along the length of said slot alternately in the reading direction of the lines of text and then in the opposite direction over the entire length of the card while being adapted to scan the parallel sound tracks on the magnetic coating of said card; means for imparting transverse movement to said card-containing frame across the card supporting plate, said means moving said frame and the card transversely upwardly for a distance of one line-spacing on said card upon said magnetic head being conveyed to one of the ends of said laterally extending slot so as to cause said magnetic head to contact the next lower sound track on said card; and a stationary transparent top strip means having a window adapted to be positioned in alignment with said laterally extending strip, said transparent strip having means for providing indication of the line of printed text on said card corresponding with the sound track in the process of being read in response to the movement of the magnetic head for each position of the card said indication means including a movable marker for correlating indication between said printed text of said sound track on the card; a drive means for said marker; means interconnecting said drive and the carriage of said magnetic head, said drive means including means for actuating said marker for movement always from the left edge of the card to the right edge relative to the wording thereon, irrespective of the direction of motion of the magnetic head, and wherein the distance traversed by the marker along the line of text from the left edge is always equal to the distance covered by the magnetic head along the corresponding tracks from the starting point of such track.

2. An apparatus as claimed in claim 1, wherein the marker is formed of two parts, said marker drive interconnection means including a thread driven by the carriage and comprising a driving side and a return side each bearing one of the said marker parts and moving parallel to said rectangular route, fixed sloping ramps being arranged on said transparent frame top portion so as to move each of said marker parts alternately inward and outward from the rectangular route according to its direction of motion whereby only one of said parts is visible at a time.

3. An apparatus as claimed in claim 2, including a spring device, said frame being adapted to be steadily pulled back in the direction of the upper edge of the card by said spring device, said spring device being manually resettable by an operator in response to gripping a handle pulling the frame toward himself and effectively toward the final lines of the text, a trigger on said spring device, the successive movements of one spacing of the frame in the opposite direction being effected by said trigger, an escapement, said trigger being responsive to said escapement actuated by the carriage each time the magnetic head closely approaches one of the ends of the slot.

4. An apparatus as claimed in claim 3, wherein said escapement comprises a sprocket wheel with staggered teeth, a shaft rigidly mounting said sprocket, said shaft carrying two pinions, two racks meshing with said pinions, said racks being located on both sides of the frame relative to the motion thereof, said sprocket including a pawl formed by the bent end of a rod extending parallel to said shaft and including two stationary lugs against which the carriage impinges, the said rod comprising flexible means pulling it back axially into a set intermediate position and a spring rotatably driving about its own axis whereby the escapement pawl is locked by the teeth of the escapement sprocket wheel against said stationary lug in the check direction and conversely releases said wheel upon the operator pulling the carriage toward himself in order to set said spring device.

5. An apparatus as claimed in claim 3, including slide bars supporting said carriage, an endless strip driven by a continuous mechanism adapted to move said carriage two sides of said strip extending parallel to the direction of motion of the carriage, a device for locking the carriage alternately on at least one side of the endless strip, said locking device including quick-trip mechanism, fixed lugs for actuating said mechanism, said lugs being adjusted whereby the reversal in direction of carriage motion is effected immediately in response to the release of said escapement.

6. An apparatus as claimed in claim 3, including slide bars supporting said carriage, an endless strap driven by a continuous mechanism for moving said carriage, two sides of said strap extending parallel to the direction of motion of the carriage, a device for locking the carriage alternately on at least one side of the endless trap, said locking device including an electromagnetic drive, a pair of lugs for actuating said electromagnetic drive through two contacts, said electromagnetic drive being adapted to operate the escapement simultaneously with the reversal in direction of carriage motion.

* * * * *